US012033823B2

(12) United States Patent
Mittelstadt et al.

(10) Patent No.: US 12,033,823 B2
(45) Date of Patent: Jul. 9, 2024

(54) CIRCUIT BREAKERS

(71) Applicant: Schneider Electric USA, Inc., Boston, MA (US)

(72) Inventors: Chad R. Mittelstadt, Andover, MA (US); Austin Derby, Andover, MA (US); Salaheddine Faik, Andover, MA (US)

(73) Assignee: Schneider Electric USA, Inc., Boston, MA (US)

( * ) Notice: Subject to any disclaimer, the term of this patent is extended or adjusted under 35 U.S.C. 154(b) by 212 days.

(21) Appl. No.: 17/563,946

(22) Filed: Dec. 28, 2021

(65) Prior Publication Data

US 2023/0207244 A1 Jun. 29, 2023

(51) Int. Cl.
*H01H 71/02* (2006.01)
*H01H 71/50* (2006.01)

(52) U.S. Cl.
CPC ...... *H01H 71/0207* (2013.01); *H01H 71/505* (2013.01); *H01H 2071/508* (2013.01)

(58) Field of Classification Search
CPC ............. H01H 71/0207; H01H 71/505; H01H 2071/508
USPC ..................................... 335/68, 35, 172–174
See application file for complete search history.

(56) References Cited

U.S. PATENT DOCUMENTS 4,220,935 A * 9/1980 Wafer ................ H01H 71/2454 335/38
4,245,140 A 1/1981 Jencks et al.
4,255,732 A * 3/1981 Wafer ................ H01H 71/2418 335/193
4,301,435 A * 11/1981 Castonguay ........... H01H 77/10 335/26
4,623,859 A 11/1986 Erickson et al.
5,343,179 A * 8/1994 Pipich ................ H01H 71/2463 335/172
5,545,867 A 8/1996 Castonguay et al.
5,831,500 A * 11/1998 Turner ................... H01H 71/70 335/14
5,834,997 A 11/1998 Fleege et al.
7,498,535 B2 3/2009 Blake et al.
7,528,690 B2 5/2009 Christmann et al.
8,207,804 B2 * 6/2012 Ohtsuka ................... H01H 3/30 200/17 R
10,134,554 B2 11/2018 Kim et al.
2008/0117006 A1 * 5/2008 Claeys ................... H01H 71/40 335/35
2011/0273249 A1 11/2011 Wan et al.

OTHER PUBLICATIONS

Extended European Search Report issued by Valeri Pavlov, of the European Patent Office, dated May 23, 2023, in corresponding European Patent Application No. 22209245.4.

* cited by examiner

*Primary Examiner* — Alexander Talpalatski
(74) *Attorney, Agent, or Firm* — Locke Lord LLP

(57) ABSTRACT

A circuit breaker can include a moveable electrical contact configured to be moved between an open position and a closed position, and a lever assembly configured to prevent the progressive closing of the moveable electrical contact to the closed position such that the lever assembly is configured to cause snap action closing of the moveable electrical contact at a charged position of a motorized slider.

19 Claims, 13 Drawing Sheets

100

CIRCUIT BREAKERS

FIELD

This disclosure relates to circuit breakers.

BACKGROUND

Traditional motorized circuit breakers, for example, have mechanisms that allow opening of the contacts to open the circuit. However, in returning to the closed state, motorized systems include relatively slow closure which can affect performance negatively (e.g., extended arcing between contacts leading to contact degradation).

Such conventional methods and systems have generally been considered satisfactory for their intended purpose. However, there is still a need in the art for improved circuit breakers. The present disclosure provides a solution for this need.

SUMMARY

In accordance with at least one aspect of this disclosure, a circuit breaker can include a moveable blade having an electrical contact thereon or attached thereto and configured to make contact with a fixed electrical contact in a closed position, and to be separated from the fixed electrical contact in an open position. The blade can be biased to the closed position. The circuit breaker can include a kicker lever having or connected to a kicker. The kicker can be configured to contact the blade to move the blade to the open position. The kicker lever can be configured to move the kicker to move blade to the open position. The circuit breaker can include a slider configured to linearly move between at least a first position and a second position. The slider can be shaped to contact and move the kicker lever in a first direction toward the first position to consequently move the blade to the open position. The slider can be configured to move in a second direction away from the kicker lever toward the second position.

The circuit breaker can include a catch lever configured to catch and hold the kicker lever to prevent the kicker lever from allowing the blade to move toward the closed position. The slider can be configured to separate from the kicker lever in the second direction when the kicker lever is engaged to the catch lever. The slider can be configured to contact the catch lever to move the catch lever to disengage the catch lever from the kicker lever after the slider has separated from the kicker lever in the second direction to allow the kicker lever and the kicker to snap release the blade to allow snap closing of the electrical contact to the fixed electrical contact.

The circuit breaker can include a biasing member configured to bias the slider to the first position. The circuit breaker can include a motor assembly operatively connected to the slider and configured to actuate the slider in the second direction toward the second position against the bias of the biasing member to charge the slider. The motor assembly can be configured to release the slider in response to an open command to allow the slider to snap to the first position by the bias of the biasing member to move the kicker lever to consequently cause the blade to move the electrical contact to the open position.

The kicker lever can be rotatably mounted about a first point at a kicker lever base. The kicker lever can include a kicker extension configured to contact the slider. The kicker lever can include a kicker lever tab extending outwardly from the base.

The catch lever can be rotatably mounted about a second point different from the first point. The catch lever can include a catch extension configured to contact the slider to be moved by the slider when the slider is moving in the second direction toward the second position. In certain embodiments, the second point can be above and behind the first point relative to the slider. The catch lever extension and the kicker lever extension can be shaped to extend in the second direction and downward toward the slider.

The catch lever can include a catch tab configured to engage the kicker lever tab when the slider moves in the second direction from the first position to prevent further motion of the kicker lever while the catch tab and the kicker lever tab are engaged. The catch tab and the kicker lever tab can be configured to separate at the second position of the slider when the slider is separate from the kicker lever and when the catch extension and catch tab is sufficiently moved by the slider to allow the kicker lever to rotate and thereby allowing snap closure of the electrical contact to the fixed electrical contact.

In certain embodiments, when the slider is in the first position, a gap can be formed between the catch tab and the kicker lever tab such that the kicker lever can rotate with movement of the slider in the second direction until the kicker lever tab contacts the catch tab corresponding to an intermediate open position of the blade. In certain embodiments, the slider can include a slider extension configured to contact the kicker lever extension on a first side and to contact the catch lever extension on a second side.

In certain embodiments, the kicker lever can include a kicker biasing member configured to bias the kicker away from the blade when the blade is in the closed position. In certain embodiments, the slider, the kicker lever, and the catch lever can be mounted on an opposite side of a wall from the blade. The kicker can be on the opposite side of the wall relative to the kicker lever extension.

In certain embodiments, the slider can include a guide slot configured to receive a post to limit motion of the slider to axial motion. The circuit breaker can be a miniature circuit breaker. Any other suitable circuit breaker type is contemplated herein.

In accordance with at least one aspect of this disclosure, a circuit breaker can include a moveable blade, a kicker lever having a kicker configured to push the moveable blade to an open position, a slider configured to push the kicker lever to a first position to cause the moveable blade to move to the open position, and a catch lever configured to allow the slider to decouple from kicker lever, wherein the catch lever is configured to hold the kicker lever and to be moved by the slider to release the kicker lever in a second position of the slider to cause snap action closing of the moveable blade.

In accordance with at least one aspect of this disclosure, a motorized circuit breaker can include a moveable electrical contact configured to be moved between an open position and a closed position, and a lever assembly configured to prevent the progressive closing of the moveable electrical contact to the closed position such that the lever assembly is configured to cause snap action closing of the moveable electrical contact at a charged position of a motorized slider.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
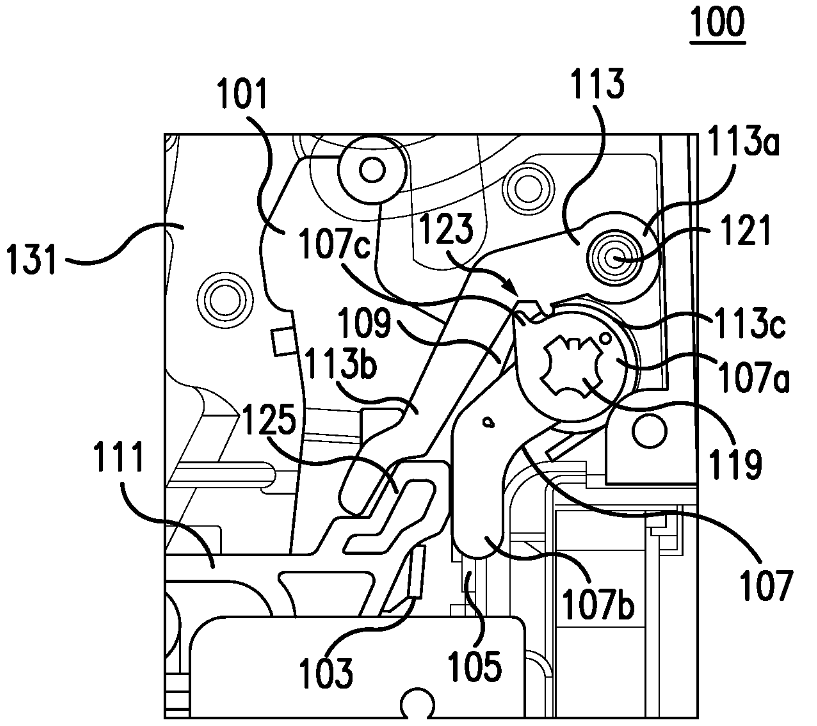
FIG. 1A is a partial cross-sectional view of an embodiment of a circuit breaker in accordance with this disclosure, shown in an open position with an embodiment of a slider in a first position in accordance with this disclosure.

Reference will now be made to the drawings wherein like reference numerals identify similar structural features or aspects of the subject disclosure. For purposes of explanation and illustration, and not limitation, an illustrative view of an embodiment of a circuit breaker in accordance with the disclosure is shown in FIG. 1A and is designated generally by reference character 100. Other embodiments and/or aspects of this disclosure are shown in FIGS. 1B-4D. Certain embodiments described herein can be used to provide snap action closing performance, e.g., for motorized circuit breakers.

Figure 1B:
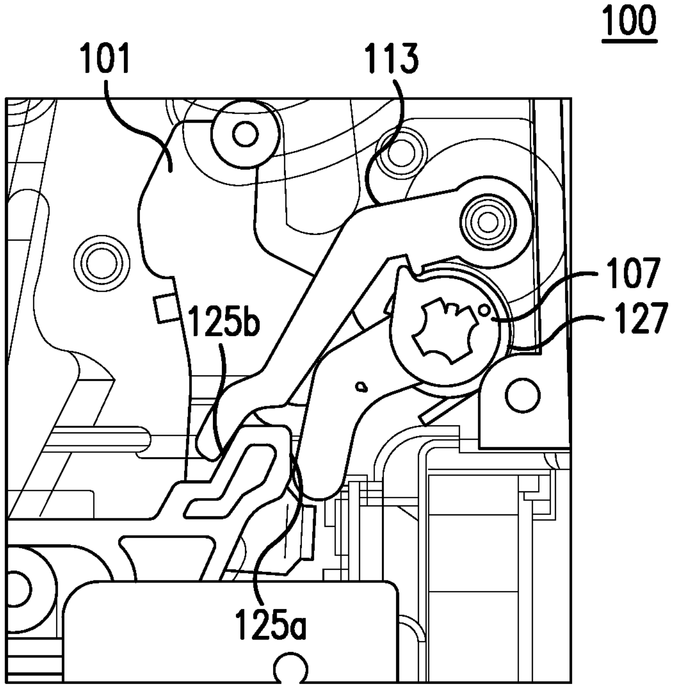
FIG. 1B is a partial cross-sectional view of the embodiment of FIG. 1A, shown in an intermediate open position with an embodiment of a slider moving in a second direction toward a second position in accordance with this disclosure, wherein the kicker lever is shown engaging with the catch lever to prevent further rotation of the kicker lever.
Figure 1C:
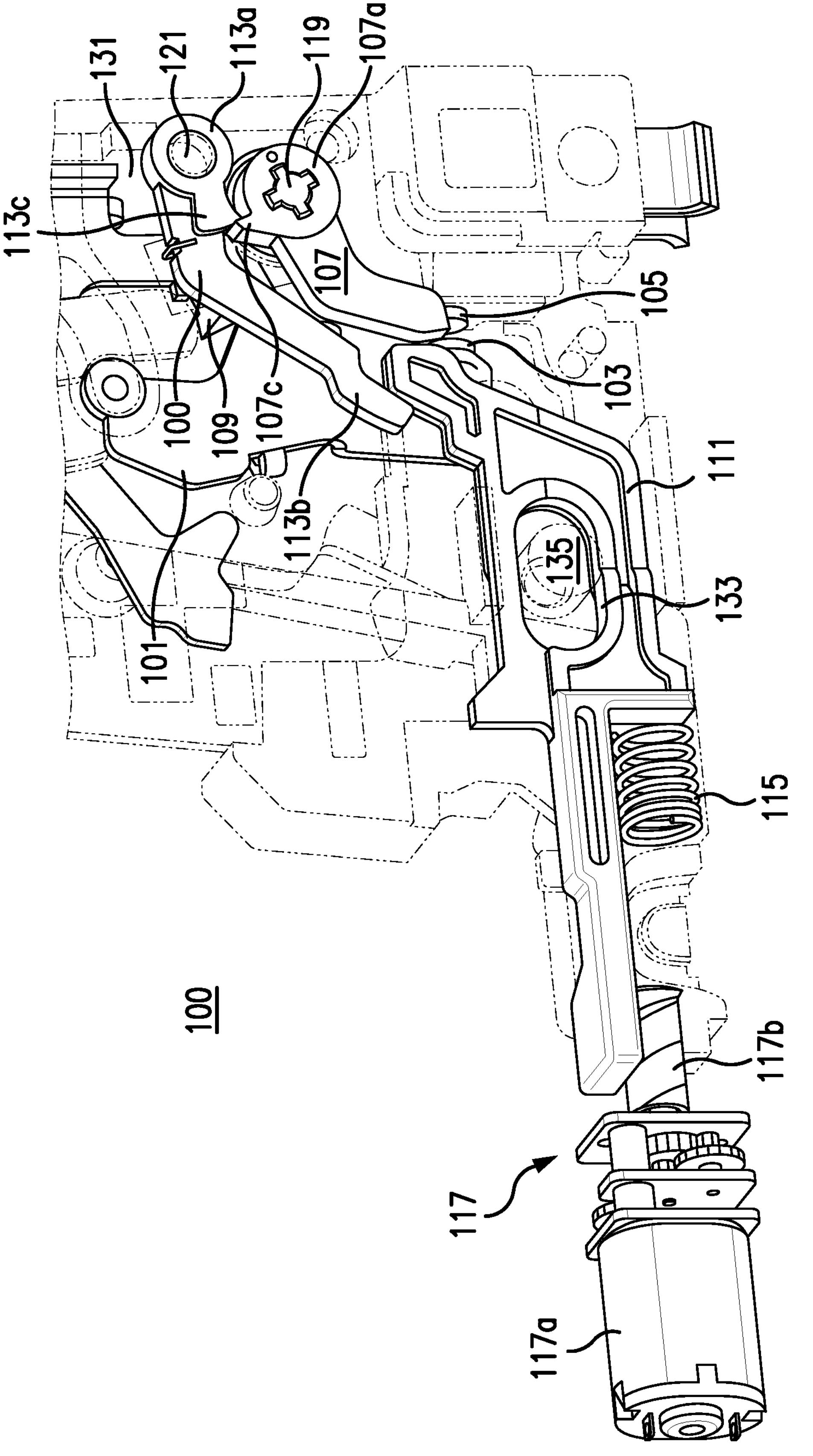
FIG. 1C is a perspective view of the embodiment of FIG. 1A, shown in an intermediate open position with an embodiment of a slider moving further in a second direction toward the second position, wherein the slider is shown separating from the kicker lever while the kicker lever is engaged with the catch lever.
Figure 1D:
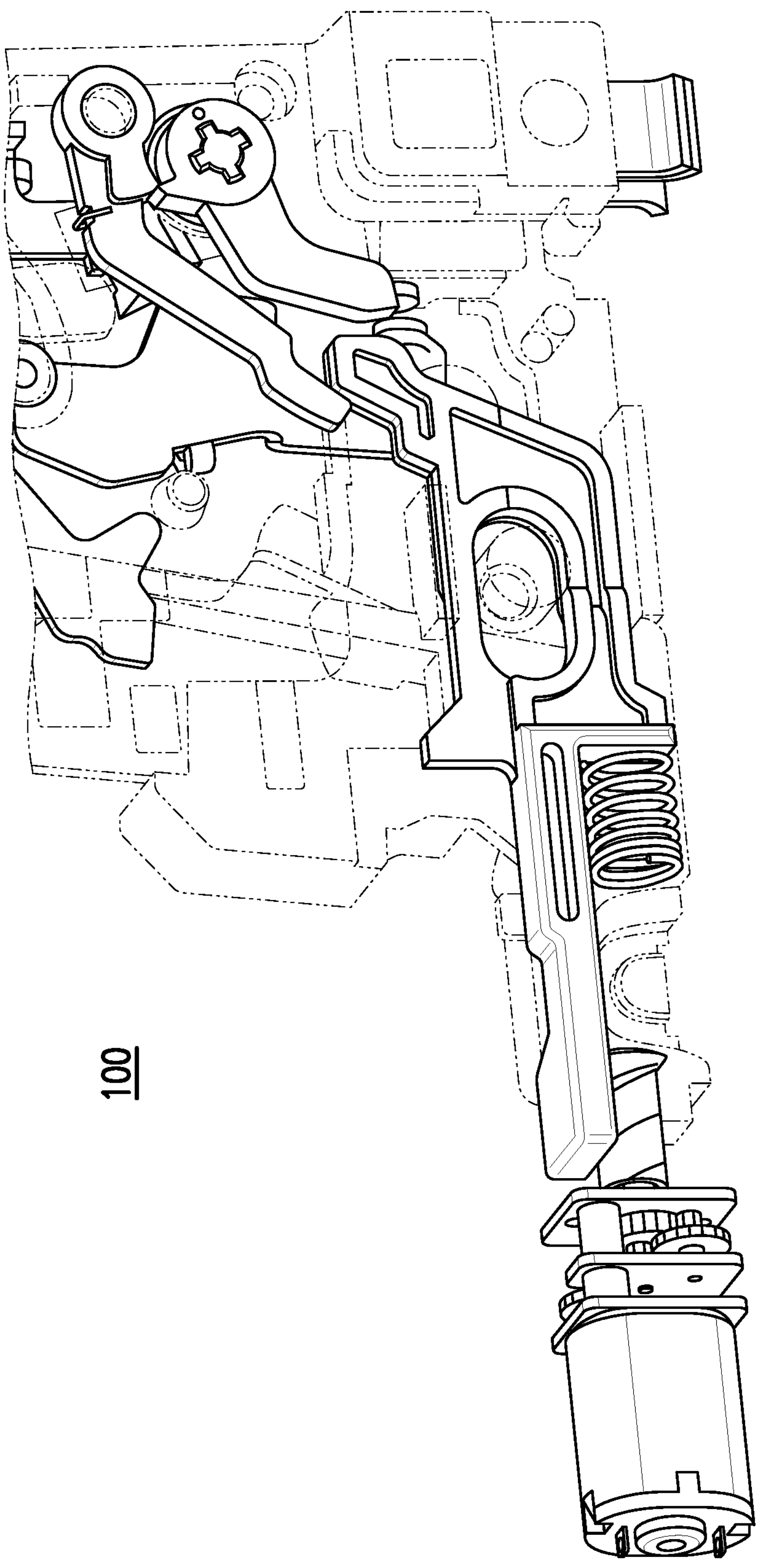
FIG. 1D is a perspective view of the embodiment of FIG. 1A, shown in an intermediate open position with an embodiment of a slider moving further still in a second direction toward a second position.
Figure 1E:
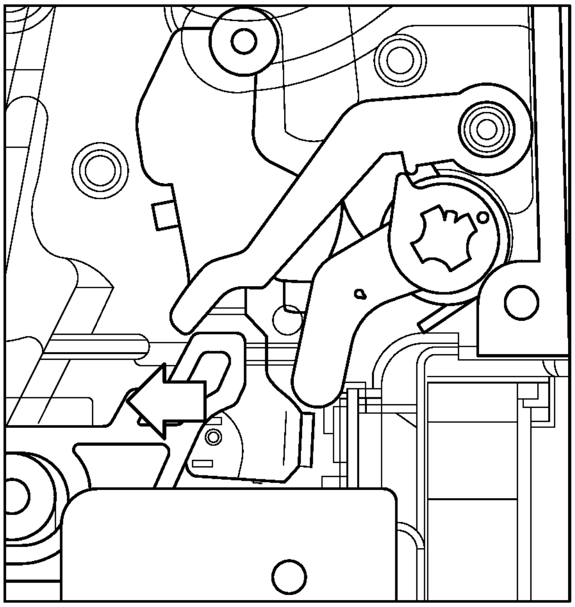
FIG. 1E is a partial cross-sectional view of the embodiment of FIG. 1A, shown in an intermediate open position with the slider moving in a second direction toward the second position, wherein an embodiment of a catch lever is shown disengaging with an embodiment of a kicker lever with further motion of the slider toward the second position, wherein the slider is shown separated from the kicker lever.
Figure 1F:
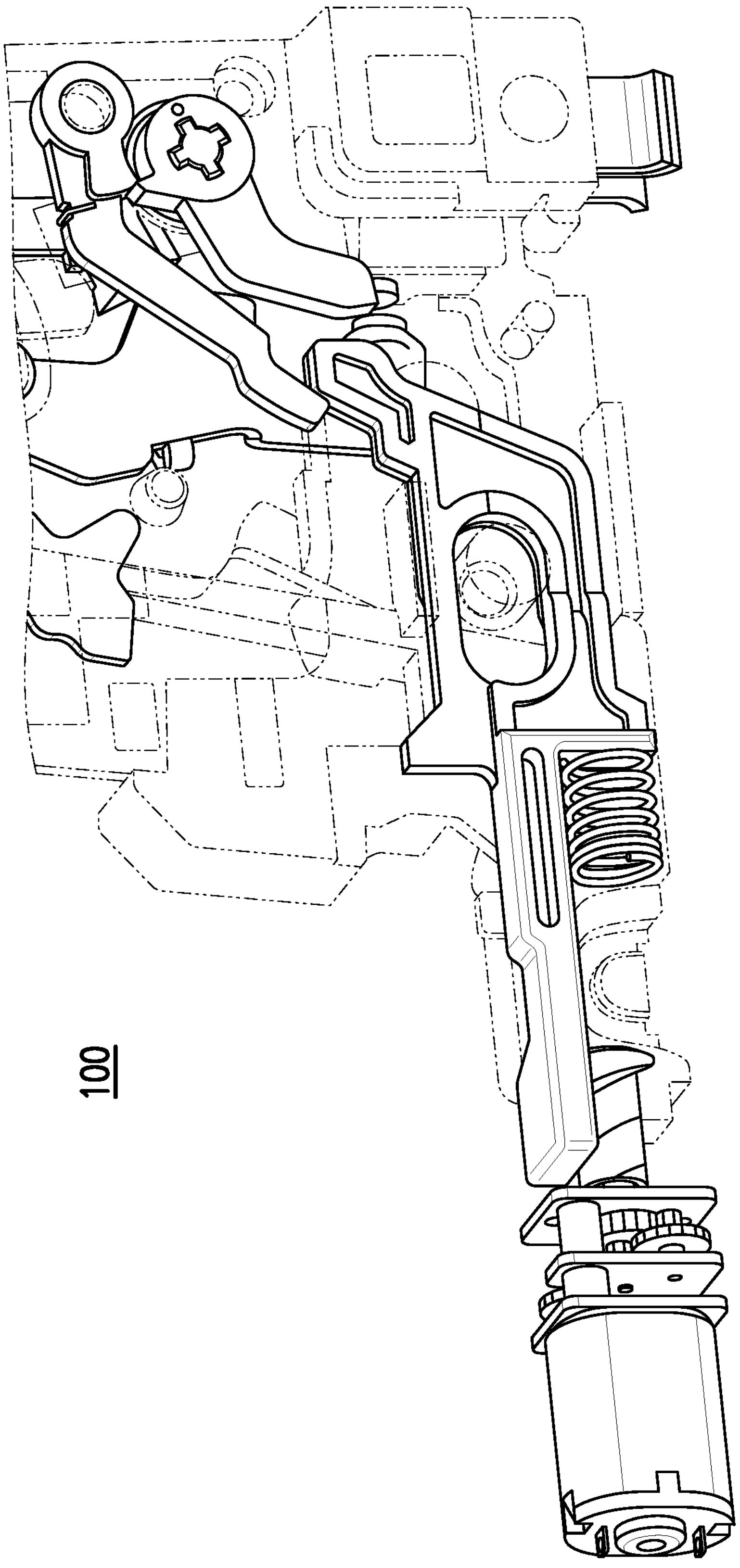
FIG. 1F is a perspective view of the embodiment as shown in FIG. 1E.
Figure 1G:
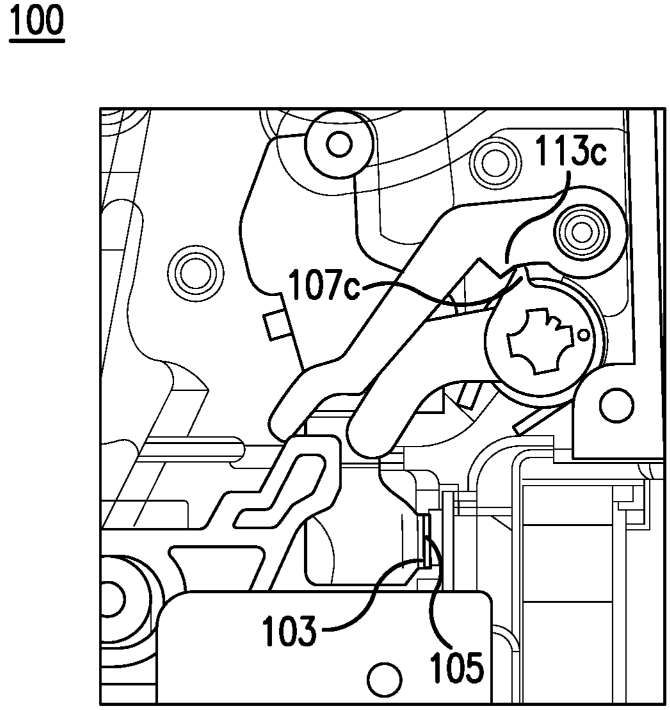
FIG. 1G is a partial cross-sectional view of the embodiment of FIG. 1A, shown in a closed position with the slider in a second position in accordance with this disclosure, wherein the catch lever is shown disengaged from the kicker lever which allowed the kicker lever to rotate to allow the shown embodiment of a blade snap close from the intermediate open position to the closed position.

In accordance with at least one aspect of this disclosure, referring to FIG. 1A, a circuit breaker 100 can include a moveable blade 101 having an electrical contact 103 thereon or attached thereto and configured to make contact with a fixed electrical contact fixed electrical contact 105 in a closed position (e.g., as shown in FIG. 1G), and to be separated from the fixed electrical contact 105 in an open position (e.g., as shown in FIG. 1A). The blade 101 can be biased to the closed position (e.g., via a blade biasing member such as a spring). The circuit breaker 100 can include a kicker lever 107 having or connected to a kicker 109.

The kicker 109 can be configured to contact the blade 101 to move the blade 101 to the open position (e.g., against the bias of the blade biasing member with force applied to the kicker lever 107). For example, the kicker lever 107 can be configured to move the kicker 109 to move blade 101 to the open position. In certain embodiments, the kicker 109 and the kicker lever 107 can be attached by a fixed joint, for example, and can move together as one piece. Any suitable direct or indirect relationship between the kicker lever 107 and the kicker 109 is contemplated herein.

The circuit breaker 100 can include a slider 111 configured to linearly move between at least a first position (e.g., as shown in FIG. 1A) and a second position (e.g., as shown in FIG. 1G). The slider 111 can be shaped to contact and move the kicker lever 107 in a first direction (e.g., slider motion to the right of the page as shown) toward the first position (e.g., as shown in FIG. 1A) to consequently move the blade 101 to the open position. The slider 111 can be configured to move in a second direction (e.g., slider motion to the left on the page as shown) away from the kicker lever 107 toward the second position.

Referring additionally to FIG. 1B, the circuit breaker 100 can include a catch lever 113 configured to catch and hold the kicker lever 107 to prevent the kicker lever 107 from allowing the blade 101 to move toward the closed position. Referring additionally to FIGS. 1C, 1D, 1E, and 1F, the slider 111 can be configured to separate from the kicker lever 107 in the second direction when the kicker lever 107 is engaged to the catch lever 113. This can prevent the kicker lever 107 from progressively tracking the slider 111 to prevent slow closure of the contacts 103, 105.

Figure 1H:
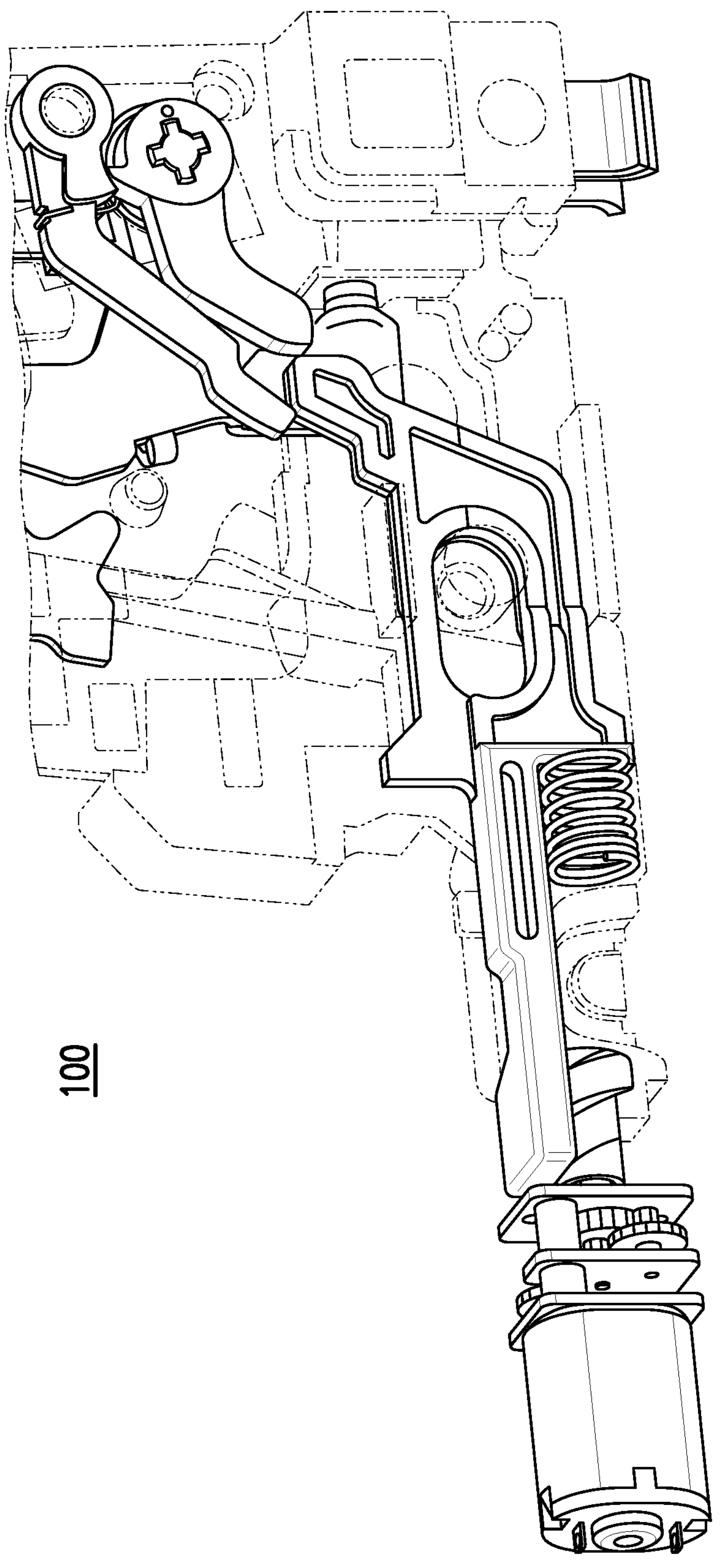
FIG. 1H is a perspective view of the embodiment as shown in FIG. 1G.

Referring additionally to FIGS. 1G and 1H, the slider 111 can be configured to contact the catch lever 113 to move the catch lever 113 to disengage the catch lever 113 from the kicker lever 107 after the slider 111 has separated from the kicker lever 107 in the second direction (e.g., far enough to not contact the kicker lever 107 when the kicker lever 107 rotates clockwise as shown) to allow the kicker lever 107 and the kicker 109 to snap release the blade 101 to allow snap closing (e.g., single, uninterrupted, and/or instantaneous/fast motion) of the electrical contact 103 to the fixed electrical contact 105.

As shown, e.g., in FIG. 1C, the circuit breaker 100 can include a biasing member 115 (e.g., a coiled spring) configured to bias the slider 111 to the first position (e.g., as shown in FIG. 1A). The circuit breaker 100 can include a motor assembly 117 operatively connected to the slider 111 and configured to actuate the slider 111 in the second direction toward the second position against the bias of the biasing member 115 to charge the slider. The motor assembly 117 can be configured to release the slider 111 in response to an open command (e.g., when a remote control open command is received from; a remote app or other software, a local user interface on the circuit breaker, or self-initiated from an electronic or software element inside the circuit breaker itself) to allow the slider to move quickly (e.g., snap in a single motion) to the first position (e.g., as shown in FIG. 1A) by the bias of the biasing member 115 to move the kicker lever 107 to consequently cause the blade 101 to move the electrical contact 103 to the open position (e.g., as shown in FIG. 1A). The motor assembly 117 can include any suitable motor, gear box, and/or gearing assembly. For example, the motor assembly 117 can include a motor 117*a* connected to the slider 111 via a worm gear 117*b* meshed with one or more teeth (not specifically shown) on the slider 111. The motor 117*a* can be controlled by any suitable logic module (e.g., a wireless module connected to the motor).

The worm gear 117*b* can be configured to mechanically release the slider 111 when the slider 111 is pulled toward the motor 117*a* beyond a certain point. For example, in certain embodiments, the assembly can be the same or similar to the in U.S. patent application Ser. Nos. 17/353,895 and 17/353,888, incorporated herein by reference in their entirety. In this regard, the motor assembly 117 can charge the slider 111 and hold it in the charged state (e.g., when or after the contacts 103, 105 are in a closed position) just before release such that only a small turn of the worm gear 117*b* to pull the slider 111 in the second direction causes release of the slider 111 and snap motion of the slider 111 to the first position. This can allow for fast opening of the circuit in response to an open command.

The kicker lever 107 can be rotatably mounted about a first point 119 at a kicker lever base 107*a*. The kicker lever 107 can include a kicker extension 107*b* configured to contact the slider 111.

The kicker lever 107 can include a kicker lever tab 107*c* extending outwardly from the base 107*a*, for example. Any other suitable location for the kicker lever tab 107*c* location is contemplated herein.

The catch lever 113 can be rotatably mounted about a second point 121 different from the first point 119. The catch lever 113 can include a catch base 113*a*, and a catch extension 113*b* configured to contact the slider 111 to be moved by the slider 111 when the slider 111 is moving in the second direction toward the second position. In certain embodiments, the second point 121 can be above and behind the first point 119 relative to the slider 111 (e.g., as shown by the relative page position).

The catch lever extension 113*b* and the kicker lever extension 107*b* can be shaped to extend in the second direction and downward toward the slider 111, e.g., as shown. Any suitable shape for the catch lever extension 113*b* and/or the kicker lever extension 107*b* (e.g., bent, double bent) to allow the disclosed function is contemplated herein.

The catch lever 113 can include a catch tab 113*c* configured to engage the kicker lever tab 107*c* when the slider 111 moves in the second direction from the first position (e.g., as shown in FIG. 1A) to prevent further motion of the kicker lever 107 while the catch tab 113*c* and the kicker lever tab 107*c* are engaged (e.g., as shown in FIG. 1B). The catch tab 113 can extend laterally from the catch lever base 113*a* and/or the catch lever extension 113*b*. The catch tab 113 and the kicker lever tab 107 can be configured to separate at the second position of the slider 111 when the slider 111 is separate from the kicker lever 107 and when the catch extension 113*b* and catch tab 103*c* is sufficiently moved by the slider 111 to allow the kicker lever 107 to rotate (e.g., just after the position shown in FIG. 1E) and thereby allowing snap closure of the electrical contact 103 to the fixed electrical contact 105 (e.g., as shown in FIG. 1G).

In certain embodiments, as shown in FIG. 1A, when the slider 111 is in the first position, a gap 123 can be formed between the catch tab 113*c* and the kicker lever tab 107*c* such that the kicker lever 103 can rotate with movement of the slider 111 in the second direction until the kicker lever tab 107*c* contacts the catch tab 113*c* corresponding to an intermediate open position (e.g., partially closed; shown in FIGS. 1B-1F) of the blade 101. In certain embodiments, e.g., as shown in FIG. 1B, the slider 111 can include a slider extension 125 configured to contact the kicker lever extension 107*b* on a first side 125*a* (e.g., right side as shown) and to contact the catch lever extension 113*b* on a second side 125*b* (e.g., left side as shown).

In certain embodiments, the kicker lever 107 can include a kicker biasing member 127 (e.g., a torsional spring) configured to bias the kicker lever 107, and thus the kicker 109, away from the blade 101 when the blade 101 is in the closed position (e.g., as shown in FIGS. 1G and 1H). The gap created between the kicker 109 and the blade 101 in the closed position can allow for wearing of electrical contacts 103, 105 and still provide clearance for proper function.

In certain embodiments, the slider 111, the kicker lever 107, and the catch lever 113 can be mounted on an opposite side of a wall 131 (e.g., a plastic housing) from the blade 101. As shown, the kicker 109 can be on the opposite side of the wall 131 relative to the kicker lever extension 107*b*, for example.

In certain embodiments, the kicker 109 can be made of an insulating material (e.g., plastic) and the kicker lever base 107*a* and/or kicker lever extension 107*b* can be made of metal (or vice versa, so as to not conduct electricity from the blade 101). In certain embodiments, e.g., as shown in FIG.

1C, the slider 111 can include a guide slot 133 configured to receive a post 135 to limit motion of the slider 111 to axial motion (and to limit the axial motion of the slider 111).

In certain embodiments, the circuit breaker 100 can be a miniature circuit breaker. The circuit breaker can be a single pole or multi pole type. Any other suitable circuit breaker type is contemplated herein. Any suitable disambiguation of components disclosed herein is contemplated herein. Any other suitable additional components are contemplated herein.

Additional embodiments are shown in FIGS. 2A-4D. Each embodiment can include similar components and/or provide similar functions as the embodiment of FIGS. 1A-1H.

Figure 2A:
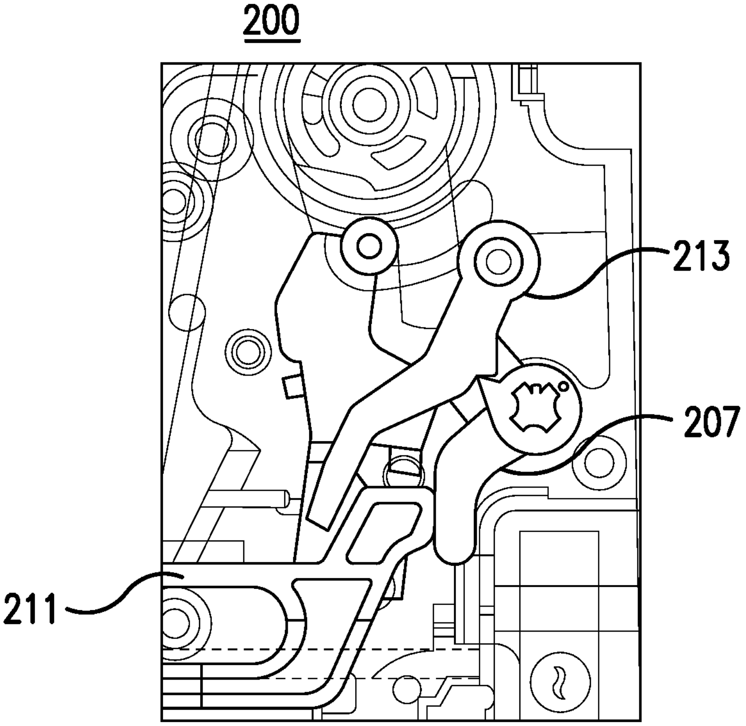
FIG. 2A is a schematic diagram of another embodiment of a circuit breaker in accordance with this disclosure, shown in an open position.
Figure 2B:
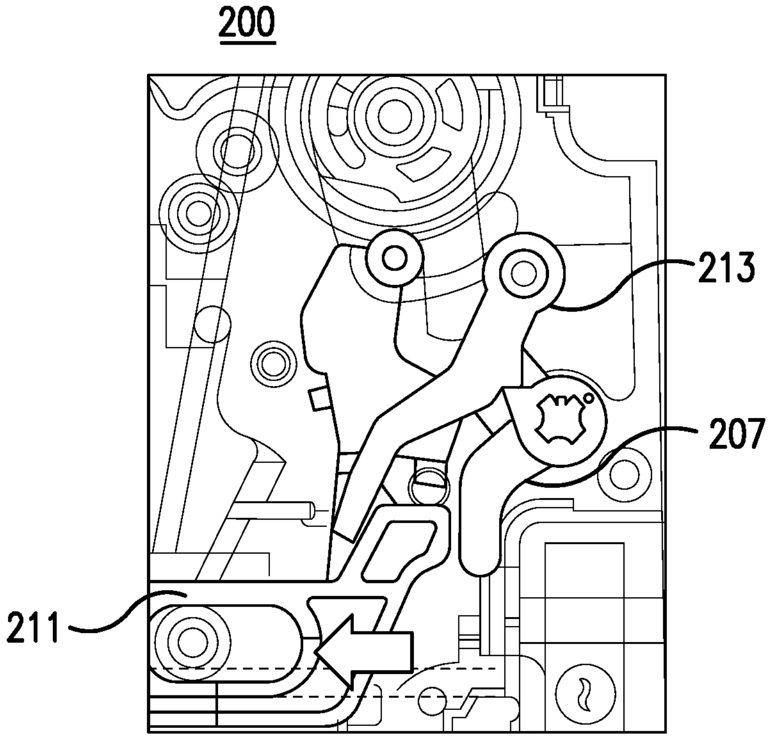
FIG. 2B is a schematic diagram of the embodiment of FIG. 2A, shown in an intermediate open position with the embodiment of a kicker lever shown engaged to the shown embodiment of the catch lever.
Figure 2C:
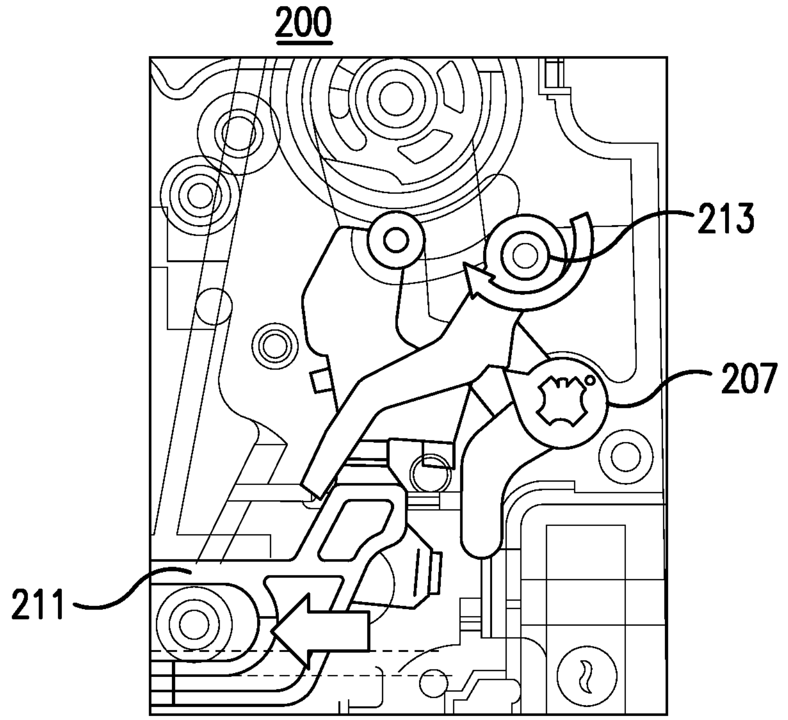
FIG. 2C is a schematic diagram of the embodiment of FIG. 2A, shown still in the intermediate open position with the shown embodiment of a slider separated from the kicker lever.
Figure 2D:
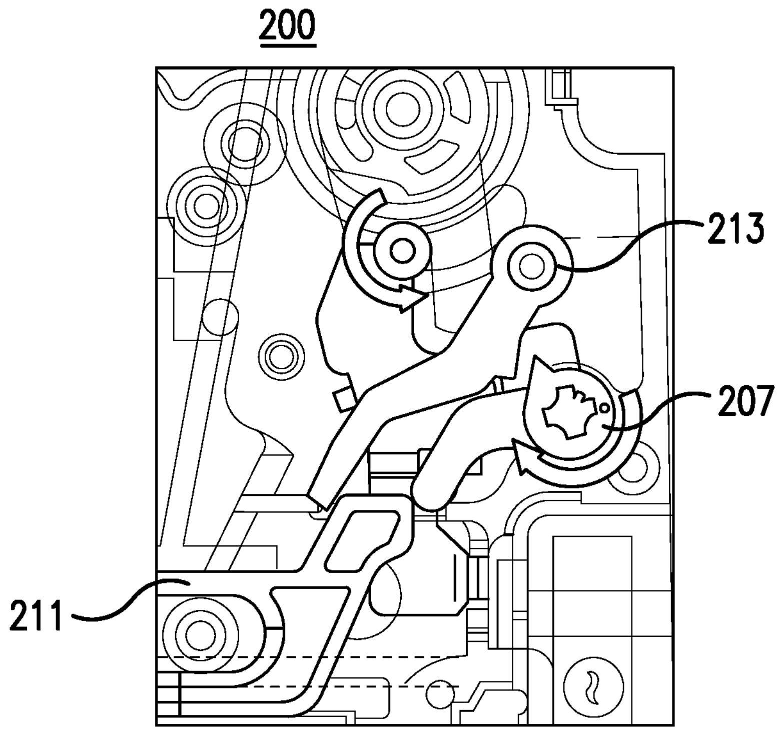
FIG. 2D is a schematic diagram of the embodiment of FIG. 2A, shown in a closed position after the catch lever released the kicker lever causing snap action closing.

FIG. 2A is a schematic diagram of another embodiment of a circuit breaker 200, shown in an open position. FIG. 2B shows the circuit breaker 200 in an intermediate open position with the embodiment of a kicker lever 207 shown engaged to the shown embodiment of the catch lever 213. FIG. 2C shows the circuit breaker 200 still in the intermediate open position with the shown embodiment of a slider 211 separated from the kicker lever 207. FIG. 2D shows the circuit breaker 200 in a closed position after the catch lever 213 released the kicker lever 207 causing snap action closing.

Figure 3A:
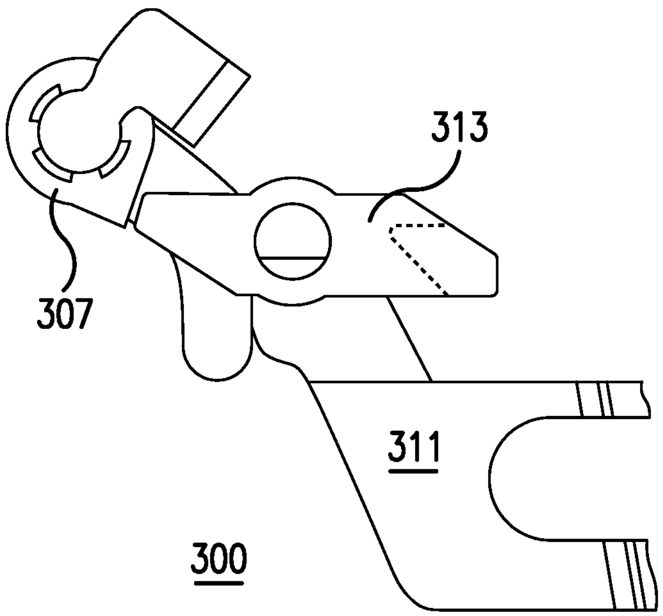
FIG. 3A is a schematic diagram of another embodiment of a circuit breaker in accordance with this disclosure, shown in an open position.
Figure 3B:
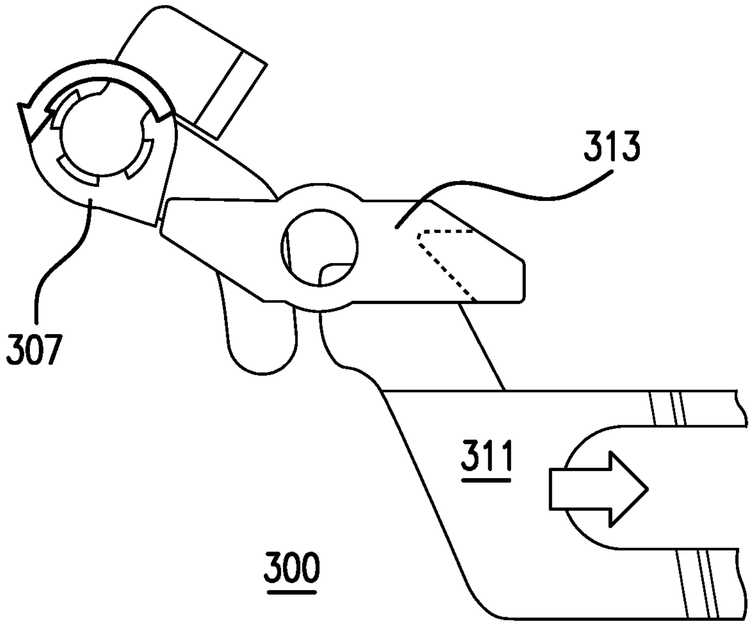
FIG. 3B is a schematic diagram of the embodiment of FIG. 3A, shown in an intermediate open position with the embodiment of a kicker lever shown engaged to the shown embodiment of the catch lever.
Figure 3C:
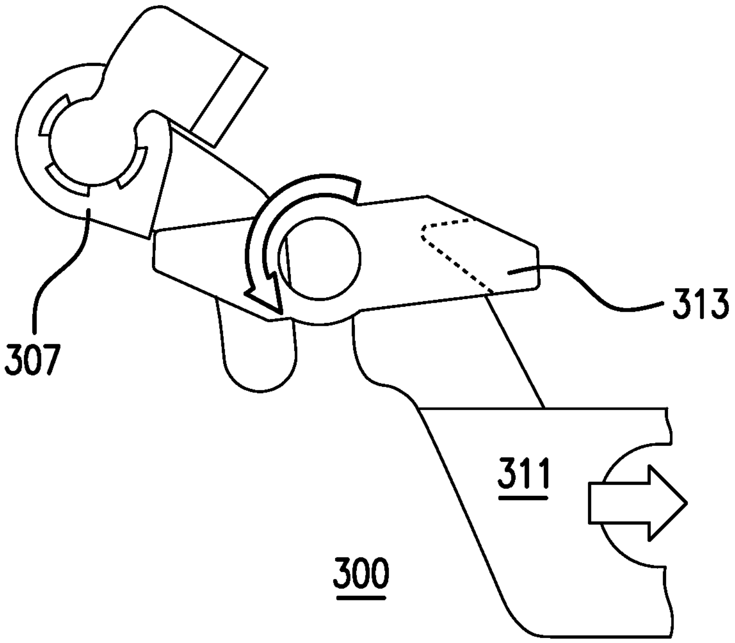
FIG. 3C is a schematic diagram of the embodiment of FIG. 3A, shown in another intermediate open position with the shown embodiment of a slider separated from the kicker lever.
Figure 3D:
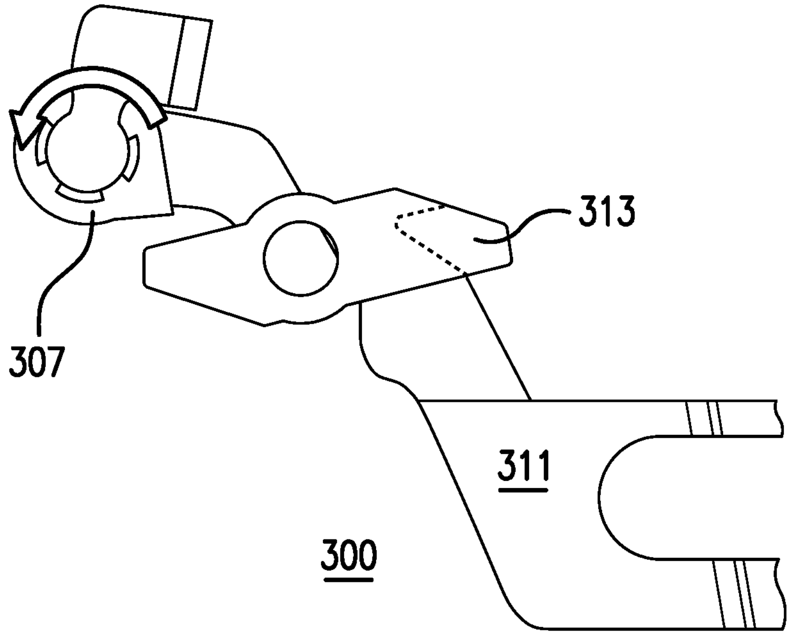
FIG. 3D is a schematic diagram of the embodiment of FIG. 3A, shown in a closed position after the catch lever released the kicker lever causing snap action closing.

FIG. 3A is a schematic diagram of another embodiment of a circuit breaker 300 in accordance with this disclosure, shown in an open position. FIG. 3B shows the circuit breaker 300 in an intermediate open position with the embodiment of a kicker lever 307 shown engaged to the shown embodiment of the catch lever 313. FIG. 3C shows the circuit breaker 300 in another intermediate open position with the shown embodiment of a slider 311 separated from the kicker lever 307. FIG. 3D shows the circuit breaker 300 in a closed position after the catch lever 313 released the kicker lever 307 causing snap action closing.

Figure 4A:
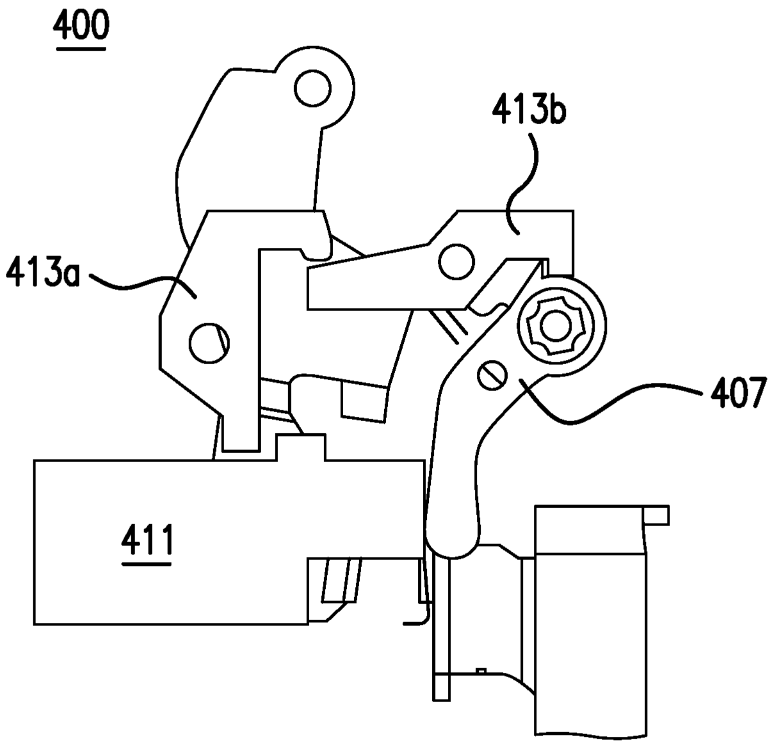
FIG. 4A is a schematic diagram of another embodiment of a circuit breaker in accordance with this disclosure, shown in an open position.
Figure 4B:
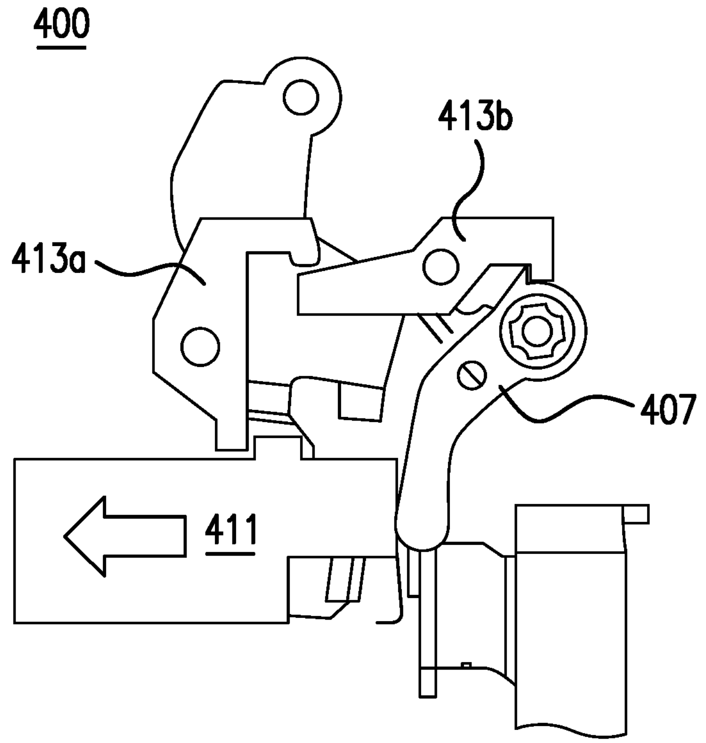
FIG. 4B is a schematic diagram of the embodiment of FIG. 4A, shown in an intermediate open position with the embodiment of a kicker lever shown engaged to the shown embodiment of the catch lever, which is shown having two separate lever pieces.
Figure 4C:
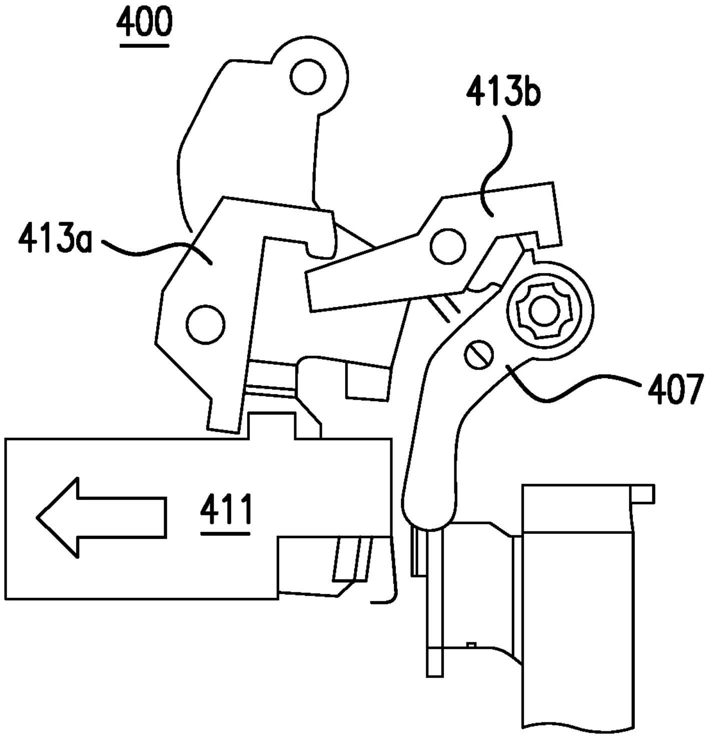
FIG. 4C is a schematic diagram of the embodiment of FIG. 4A, shown still in the intermediate open position with the shown embodiment of a slider separated from the kicker lever.
Figure 4D:
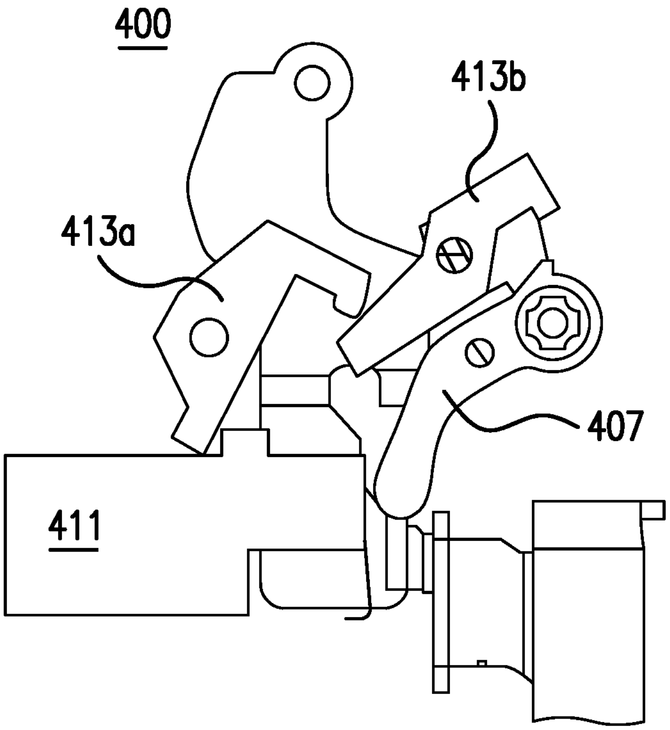
FIG. 4D is a schematic diagram of the embodiment of FIG. 4A, shown in a closed position after the catch lever released the kicker lever causing snap action closing.

FIG. 4A is a schematic diagram of another embodiment of a circuit breaker 400 in accordance with this disclosure, shown in an open position. FIG. 4B shows the circuit breaker 400 in an intermediate open position with the embodiment of a kicker lever 407 shown engaged to the shown embodiment of the catch lever 413*a*, 413*b*, which is shown having two separate lever pieces 413*a*, 413*b*. FIG. 4C shows the circuit breaker 400 still in the intermediate open position with the shown embodiment of a slider 411 separated from the kicker lever 407. FIG. 4D shows the circuit breaker 400 in a closed position after the catch lever 413 released the kicker lever 407 causing snap action closing.

In accordance with at least one aspect of this disclosure, a circuit breaker (e.g., breakers 100, 200, 300, 400) can include a moveable blade, a kicker lever having a kicker configured to push the moveable blade to an open position, a slider configured to push the kicker lever to a first position to cause the moveable blade to move to the open position, and a catch lever configured to allow the slider to decouple from kicker lever, wherein the catch lever is configured to hold the kicker lever and to be moved by the slider to release the kicker lever in a second position of the slider to cause snap action closing of the moveable blade. In certain embodiments, the circuit breaker can be the same and/or similar to any suitable embodiment of a circuit breaker disclosed herein, e.g., as described above.

In accordance with at least one aspect of this disclosure, a motorized circuit breaker (e.g., breakers 100, 200, 300, 400) can include a moveable electrical contact (e.g., on a blade as disclosed above) configured to be moved between an open position and a closed position, and a lever assembly configured to prevent the progressive closing of the moveable electrical contact to the closed position such that the lever assembly is configured to cause snap action closing of the moveable electrical contact at a charged position of a motorized slider. In certain embodiments, the motorized circuit breaker can be the same and/or similar to any suitable embodiment of a circuit breaker disclosed herein, e.g., as described above.

Embodiments of this disclosure can provide a bidirectional, bi-stable, interface. The sizing and/or shaping of parts can be selected to provide desired timing.

Embodiments can provide a way to close contacts faster for better performance in motorized circuit breakers, for example (e.g., to avoid arc damage). Embodiments can also provide a mechanically bi-stable system that can be better for fault analysis if the system stops midway through an operation.

Embodiments can provide a fast opening and closing remote control miniature circuit breaker mechanism. For example, embodiments can include a remote control circuit breaker that can close breaker contacts with similar velocity to a toggle by circuit breaker handle. Breaker systems without such fast closure assemblies and direct motor control close contacts based on the speed of the motor gearbox, which can be slow enough there is performance risk under certain conditions. Other solutions use more complicated stored energy devices, and/or large fast motors and solenoids to achieve fast opening and closing of circuit breaker contacts.

Thus, embodiments can create a mechanical logic and timing to let a moveable contact close at the right time and with the right speed. Embodiments can include a catch lever that holds a kicker lever from rotating, until the slider is out of the way far enough that lever can rotate freely, allowing blade to close freely only based on the biasing force acting on the blade (e.g., breaker toggle spring force).

Embodiments can include any suitable computer hardware and/or software module(s) to perform any suitable function (e.g., as disclosed herein). For example, certain embodiments can include a circuit and/or logic to control the motor and the state of the circuit breakers, and/or include wireless hardware to received and send signals.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A circuit breaker, comprising:

a moveable blade having an electrical contact thereon or attached thereto and configured to make contact with a fixed electrical contact in a closed position, and to be separated from the fixed electrical contact in an open position, wherein the blade is biased to the closed position;

a kicker lever having or connected to a kicker, wherein the kicker is configured to contact the blade to move the blade to the open position, wherein the kicker lever is configured to move the kicker to move blade to the open position;

a slider configured to linearly move between at least a first position and a second position, wherein the slider is shaped to contact and move the kicker lever in a first direction toward the first position to consequently move the blade to the open position, wherein the slider is configured to move in a second direction away from the kicker lever toward the second position; and a catch lever configured to catch and hold the kicker lever to prevent the kicker lever from allowing the blade to move toward the closed position, wherein the slider is configured to separate from the kicker lever in the second direction when the kicker lever is engaged to the catch lever, wherein the slider is configured to contact the catch lever to move the catch lever to disengage the catch lever from the kicker lever after the slider has separated from the kicker lever in the second direction to allow the kicker lever and the kicker to snap release the blade to allow snap closing of the electrical contact to the fixed electrical contact.

2. The circuit breaker of claim 1, further comprising a biasing member configured to bias the slider to the first position.

3. The circuit breaker of claim 2, further comprising a motor assembly operatively connected to the slider and configured to actuate the slider in the second direction toward the second position against the bias of the biasing member to charge the slider.

4. The circuit breaker of claim 3, wherein the motor assembly is configured to release the slider in response to an open command to allow the slider to snap to the first position by the bias of the biasing member to move the kicker lever to consequently cause the blade to move the electrical contact to the open position.

5. The circuit breaker of claim 1, wherein the kicker lever is rotatably mounted about a first point at a kicker lever base, and wherein the kicker lever includes a kicker extension configured to contact the slider.

6. The circuit breaker of claim 5, wherein the kicker lever includes a kicker lever tab extending outwardly from the base.

7. The circuit breaker of claim 6, wherein the catch lever is rotatably mounted about a second point different from the first point, and wherein the catch lever includes a catch extension configured to contact the slider to be moved by the slider when the slider is moving in the second direction toward the second position.

8. The circuit breaker of claim 7, wherein the second point is above and behind the first point relative to the slider.

9. The circuit breaker of claim 8, wherein the catch lever extension and the kicker lever extension are shaped to extend in the second direction and downward toward the slider.

10. The circuit breaker of claim 7, wherein the catch lever includes a catch tab configured to engage the kicker lever tab when the slider moves in the second direction from the first position to prevent further motion of the kicker lever while the catch tab and the kicker lever tab are engaged.

11. The circuit breaker of claim 10, wherein the catch tab and the kicker lever tab are configured to separate at the second position of the slider when the slider is separate from the kicker lever when the catch extension and catch tab is sufficiently moved by the slider to allow the kicker lever to rotate and thereby allowing snap closure of the electrical contact to the fixed electrical contact.

12. The circuit breaker of claim 11, wherein when the slider is in the first position, a gap is formed between the catch tab and the kicker lever tab such that the kicker lever can rotate with movement of the slider in the second direction until the kicker lever tab contacts the catch tab corresponding to an intermediate open position of the blade.

13. The circuit breaker of claim 11, wherein the slider includes a slider extension configured to contact the kicker lever extension on a first side and to contact the catch lever extension on a second side.

14. The circuit breaker of claim 11, wherein the kicker lever includes a kicker biasing member configured to bias the kicker away from the blade when the blade is in the closed position.

15. The circuit breaker of claim 11, wherein the slider, the kicker lever, and the catch lever are mounted on an opposite side of a wall from the blade.

16. The circuit breaker of claim 15, wherein the kicker is on the opposite side of the wall relative to the kicker lever extension.

17. The circuit breaker of claim 16, wherein the slider includes a guide slot configured to receive a post to limit motion of the slider to axial motion.

18. The circuit breaker of claim 1, wherein the circuit breaker is a miniature circuit breaker.

19. A circuit breaker, comprising:

a moveable blade;

a kicker lever having a kicker configured to push the moveable blade to an open position;

a slider configured to push the kicker lever to a first position to cause the moveable blade to move to the open position; and a catch lever configured to allow the slider to decouple from kicker lever, wherein the catch lever is configured to hold the kicker lever and to be moved by the slider to release the kicker lever in a second position of the slider to cause snap action closing of the moveable blade.

* * * * *